United States Patent [19]
Park

[11] Patent Number: 5,349,575
[45] Date of Patent: Sep. 20, 1994

[54] PORTABLE AUDIO DEVICE

[75] Inventor: Chung O. Park, Seoul, Rep. of Korea

[73] Assignee: Goldstar Co., Ltd., Seoul, Rep. of Korea

[21] Appl. No.: 63,470

[22] Filed: May 19, 1993

[30] Foreign Application Priority Data

May 19, 1992 [KR] Rep. of Korea .................. 1992-8411

[51] Int. Cl.5 .............................................. H04B 1/08
[52] U.S. Cl. ........................................ 369/1; 369/12; 455/347; 381/88
[58] Field of Search ....................... 369/1, 2, 6, 10, 11, 369/12, 75.1; 455/351, 347; 381/88, 89, 90, 91

[56] References Cited
U.S. PATENT DOCUMENTS 3,943,564  3/1976  Tushinsky ................................ 369/6
4,651,312  3/1987  Honma et al. ........................... 369/1

FOREIGN PATENT DOCUMENTS 58-150101  9/1983  Japan ..................................... 369/6
4247384    9/1992  Japan ..................................... 369/1
2088616    6/1982  United Kingdom ................... 369/11

OTHER PUBLICATIONS

Yamaha AST-C10, Stereo Review, Jul. 1989, p. 44.
Yamaha YST-C11, Stereo Review, Dec. 1991.

Primary Examiner—Robert J. Pascal
Assistant Examiner—Tan Dinh
Attorney, Agent, or Firm—Morgan & Finnegan

[57] ABSTRACT

A portable audio device having the functions of a cassette tape recorder, a compact disc player and an AM/FM tuner includes a slimmed body provided with the cassette tape recorder, the compact disc player and the AM/FM tuner, and at least one cover, provided on the slimmed body, for covering the cassette tape recorder and the compact disc player. The slimmed body and the at least one cover are formed to resemble a notebook.

15 Claims, 4 Drawing Sheets

PORTABLE AUDIO DEVICE

FIELD OF THE INVENTION

This invention relates to the field of audio devices, more particularly to a portable audio device which has the functions of a cassette recorder, a compact disc player and an AM/FM tuner.

BACKGROUND OF THE INVENTION

Recently various kinds of audio devices have been developed. Of these is the device generally referred to as a portable audio device. There have been two kinds of portable audio devices, that is, a portable cassette tape recorder and a portable compact disc player. The portable cassette tape recorder or the portable compact disc player may be incorporated with an AM/FM tuner. These devices are carried in portable bags or hooked on belts. The portable cassette tape recorder is controlled as necessary selecting appropriate buttons while carrying it in bags, pockets or hooking on belts. A headphone (or attachable speakers) is used inserting a plug into a jack of the device. The portable compact disc player is also used in the same manner as the portable cassette tape recorder. In case of using the cassette tape recorder and the compact disc player together, those players have to be handled individually and the connection of the headphone or the speakers to the handling players may be changed frequently.

However, for shifting the user of the players, one player being used is stopped and the other player to be used is operated, by manually handling the players. Each player has to be carried individually, it is easily distinguishable whether it is the cassette recorder player or the compact disc player by appearance. Accordingly, as the conventional portable audio devices are carried and handled individually, it is inconvenient in handling and control due to the volume of individual devices.

SUMMARY OF THE INVENTION

An object of this invention is to provide integrated and a slimmed portable audio device having a cassette tape recorder, a compact disc player and an AM/FM tuner.

Another object of this invention is to provide the portable audio devices having covers at the front face of the device as a notebook type.

Further object of this invention is to provide the portable audio device having detachable speakers.

Above objects and the other objects of this invention can be achieved by means of a portable audio device having the functions of a cassette tape recorder, a compact disc player and an AM/FM tuner, which comprises a slimmed body provided with the cassette tape recorder, the compact disc player and the AM/FM tuner, and at least one cover, provided on said slimmed body, for covering the cassette tape recorder and the compact disc player. The slimmed body and the at least one cover are formed to resemble a notebook.

DETAILED DESCRIPTION OF THE INVENTION

A preferable embodiment of this invention will be described with reference to the accompanying drawings.

Figure 1:
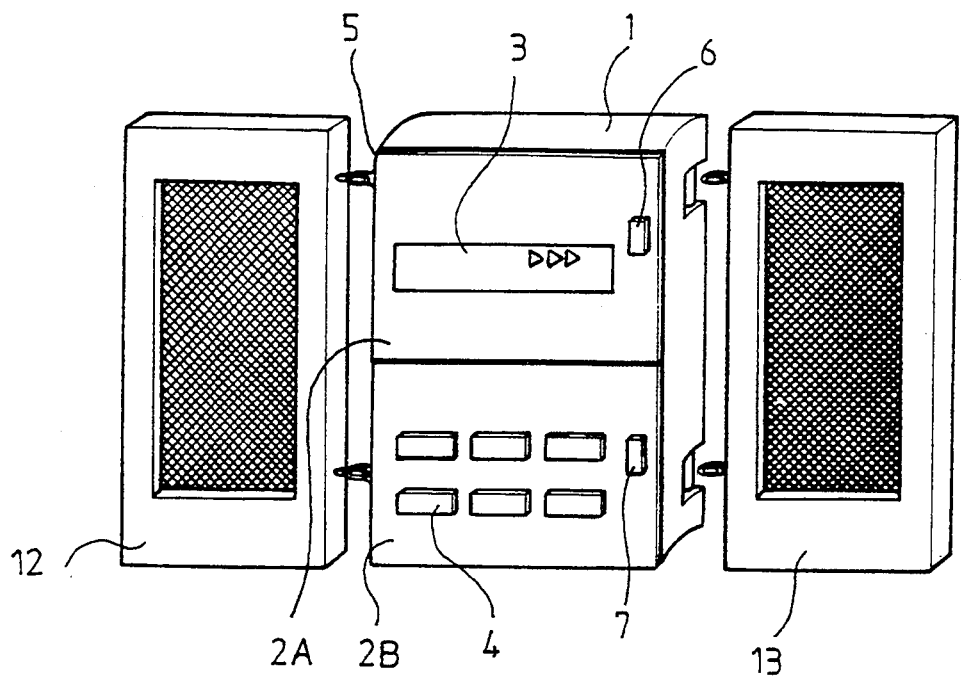
FIG. 1 is a perspective view showing an embodiment of a portable audio device according to this invention.
Figure 2:
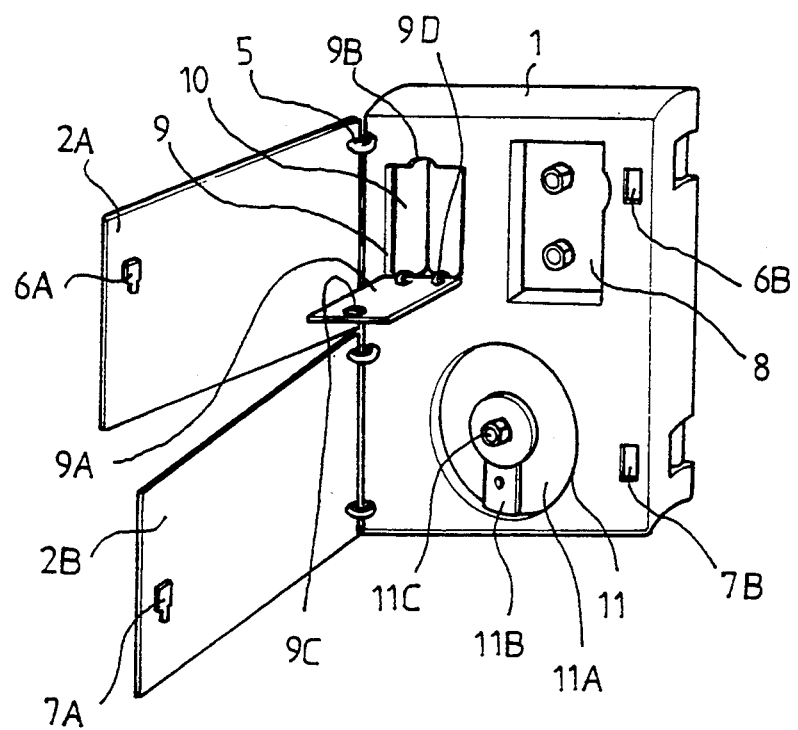
FIG. 2 is a perspective view of the showing a slimmed body and covers according to this invention.

FIG. 1 is a perspective view showing an embodiment of a portable audio device according to this invention and FIG. 2 is a perspective view of showing a slimmed body and covers according to this invention.

Referring to FIG. 1 and FIG. 2, the portable audio device of this invention includes a slimmed body 1 having a cassette tape recorder, a compact disc player and an AM/FM tuner, and covers 2A and 2B foldable like a notebook.

A cassette tape recorder cover 2A has a display part 3 for indicating the operation conditions of the device, and a compact disc player cover 2B has a key part 4 for handling the device. The covers 2A, 2B are fixed on the slimmed body 1 by hinges 5, and provided with snatch buttons 6, 7 to hold the covers 2A, 2B in closed position.

On operation of the key part 4 (for example, PLAY, STOP, REW, FF etc in case of the cassette tape recorder or the compact disc player, and TUNING in case of the AM/FM tuner), the cassette tape recorder, the compact disc player or AM/FM tuner in the slimmed body 1 will be operated, and the operation conditions of the device can be recognized visually through the display part 3. The snatch buttons 6, 7 are provided with hooks 6A, 7A inside of the covers 2A, 2B and hook receivers 6B, 7B outside of the body 1. A deck part 8 is provided for loading, unloading and operation of the cassette tape in the slimmed body 1 which may be covered by the cassette tape recorder cover 2A. Also, a battery holder 9 is provided to accommodate batteries 10 in the slimmed body 1. A battery holder cover 9A is provided for the battery holder 9 and hinged on the body 1 by hinges 9D to close the holder 9. A guide slot 9B is formed in the battery holder 9 to help exchange the batteries and a hook 9C is provided to keep the holder cover 9A in closed position. A compact disc player driving part 11 in the slimmed body 1 which is covered by the compact disc player cover 2B, includes a disc loading part 11A, a pick-up 11B and a disc holding/driving shaft 11C.

Figure 3:
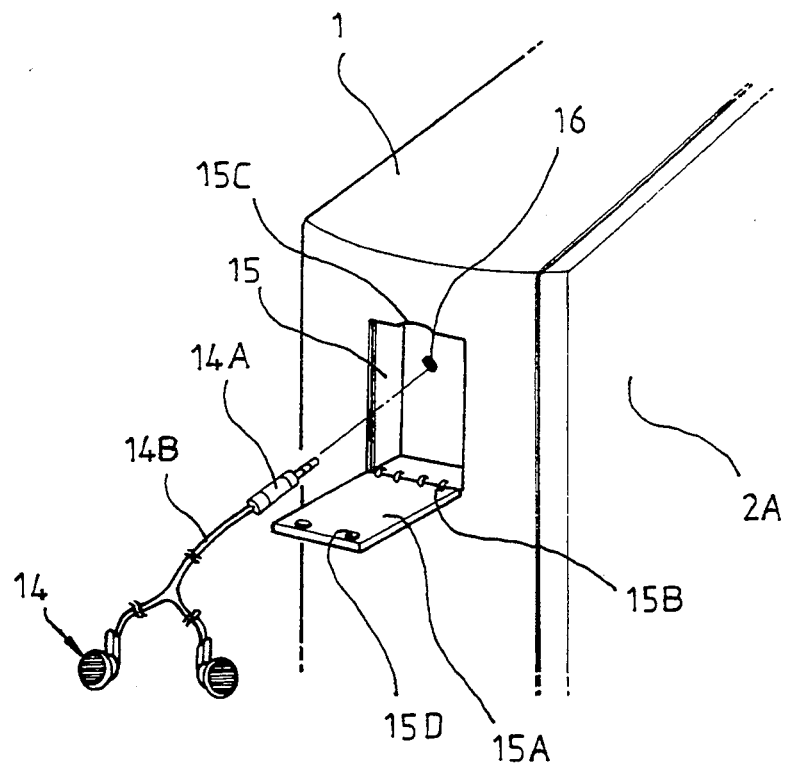
FIG. 3 is a perspective view showing a headphone holder and a cover thereof according to this invention.

FIG. 3 is a perspective view showing a headphone holder and a cover thereof according to this invention. As shown in FIG. 3, the headphone holder 15 is provided to keep a headphone 14 in one side of the slimmed body 1. The headphone holder cover 15A is connected to the body 1 by means of hinges 15B. A headphone jack 16 is provided to insert a headphone plug 14A of the headphone 14 inside of the headphone holder 14. A guide slot 15C is formed in one side of the holder 14 to lead a headphone lead line 14B through it when the cover 15A is closed after the headphone plug 14A is inserted to the jack 16. Hooks 15D are provided in the cover 15A to hold the cover 15A in closed position.

Figure 4:
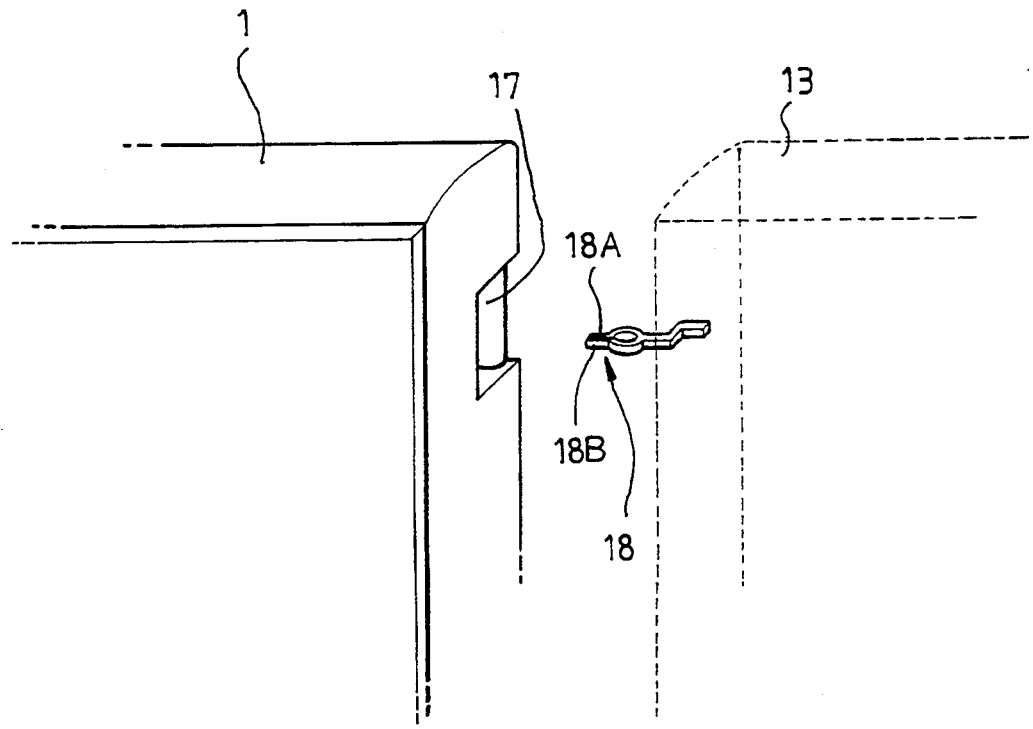
FIG. 4 is a perspective view showing a hinge shaft and a hinge plate according to this invention.

FIG. 4 is a perspective view showing a hinge shaft and a hinge plate according to this invention.

As shown in FIG. 4, the hinge shafts 17 are provided at the sides of the body 1 and the hinge plates 18 which can be connected to the hinge shafts 17 elastically, are provided at the sides of speakers 12, 13, thereby the speakers 12, 13 are detachable from the body 1. The gap between ends 18A and 18B of the hinge plates 18 is narrower than the diameter of the hinge shafts 17. Upon pressing the ends 18A, 18B of the hinge plates 18 onto the hinge shafts 17, the hinge shafts 17 are inserted to the hinge plates 18. For separation, the reverse operation of the above may be performed. By means of the above hinged structure, the speakers 12, 13 may be attached or detached from the body 1 as necessary. As the hinge shafts 17 and the hinge plates 18 are made of conductive materials, these can be also used to terminals to transmit audio signals to the speakers 12, 13.

Figure 5:
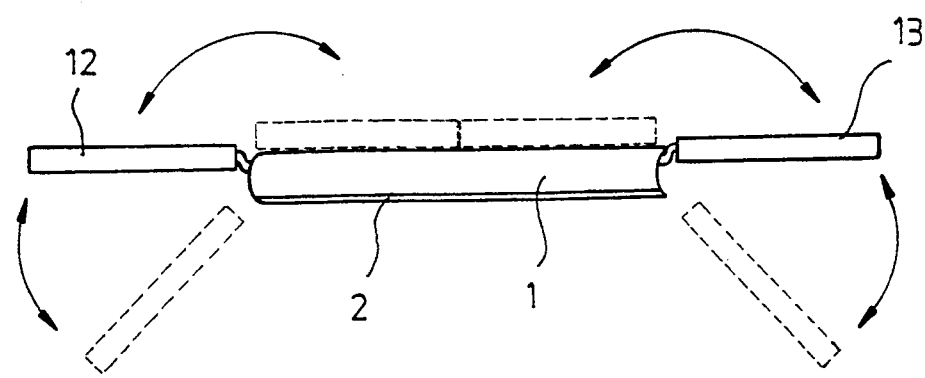
FIG. 5 is a plan view showing moving range of speakers according to this invention.

FIG. 5 is a plan view showing rotatable range of speakers according to this invention. The speakers 12, 13 are rotatable around the hinges 17, 18 in the certain range of angle as shown in FIG. 5.

Figure 6:
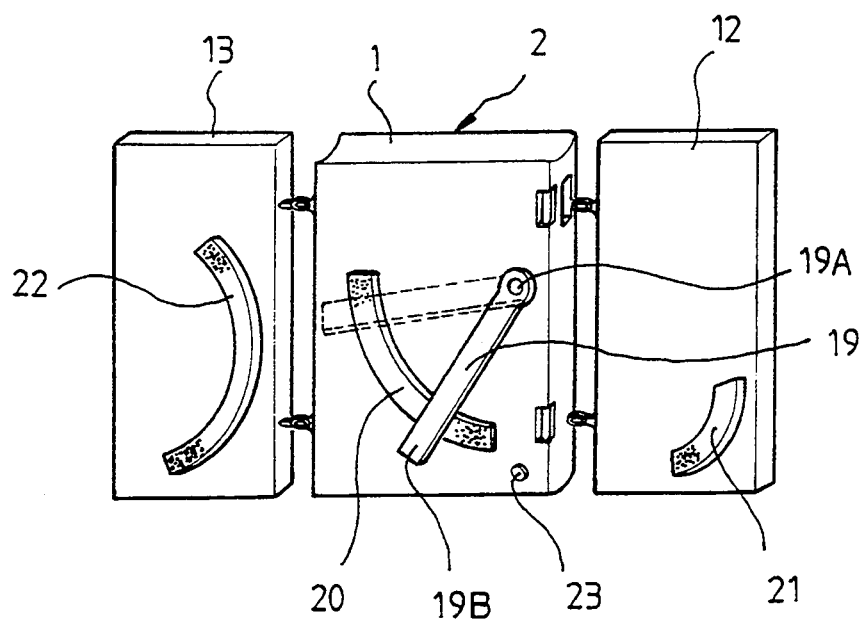
FIG. 6 is a perspective view showing a belt and adhesive members according to this invention.

FIG. 6 is a perspective view showing a belt and adhesive members according to this invention.

As shown in FIG. 6, in the portable audio device of this invention, the belt 19 is provided at the back side of the body 1 for carrying the device, one end of the belt 19 is rotatably connected to the body 1 by a shaft 19A and the other end of the belt 19 is provided with Velcro type fastener 19B which adheres to another Velcro type fastener 20 provided on the body 1 within the rotating circle of the Velcro type fastener 19B. Other Velcro type fasteners 21, 22 are provided on speakers 12, 13 respectively to adhere to the Velcro type fastener 20 provided on the body 1 when the speakers 12, 13 are folded to the back side of the body 1. The Velcro type fastener 21 on the speaker 12 may be provided in only areas where the belt 19 does not interfere when the speaker 12 is folded on the back side of the body 1. An adapter jack 23 is provided on the back side of the body 1 for power supply of alternative current.

The operation of the portable audio device is explained in detail hereinafter. For reproduction of the cassette tape, the cassette tape may be loaded on a deck 8 during the cassette tape recorder cover 2A is in opened position. The deck 8 is covered on closing of the cover 2A. The cover 2A in closed position prevents the cassette tape loaded in the deck 8 from falling off during carry along.

For exchanging the batteries, the cassette tape recorder cover 2A is opened and the holder cover 9A is pulled out by utilizing the guide slot 9B, so as to move the holder cover 9A around the hinges 9D to open position. New batteries may be replaced with old ones by utilizing the guide slot 9B. The hinges 9D hold the holder cover 9A in position preventing falling off from the body 1 and lost by shock or during carry along, and the hook 9C keeps the holder cover 9A in closed position firmly.

For reproduction of the compact disc, the compact disc player cover 2B is opened, and the compact disc is loaded in the disc loading part 11A. While the disc is clamped, the disc holding/driving shaft 11C may be rotated and the pick-up 11B may be operated.

Audio signals of the cassette tape or the compact disc (or the AM/FM tuner) are transmitted to the speakers 12, 13 or the headphone 14. The headphone 14 is kept in the headphone holder 15 with the cover 15A closed, when not in use. The hooks 15D hold the cover 15A in closed position preventing the cover 15A from opening by impact or during carry along. To use the headphone 14, the cover 15A is opened and the headphone plug 14A is inserted into the headphone jack 16. The cover 15A can be closed so that the lead line 14B may be led through the guide groove 15C.

The speakers 12, 13 can be connected to the slimmed body 1 respectively when in use, as shown in FIG. 1. The belt 19 may be used for carrying the device conveniently. The belt 19 can be fixed on a desired position by rotating around the shaft 19A and pressing the Velcro type fastener 19B of the belt 19 against the Velcro type fastener 20 of the body 1.

Upon folding the speakers 12, 13 on the back side of the slimmed body 1, the Velcro type fasteners 21, 22 on the speakers 12, 13 adhere on the Velcro type fastener 20 on the body 1, thereby fixing the speakers 12, 13 on the body 1. Accordingly, it is made possible to carry the speakers 12, 13 together with the slim body 1.

Figure 7:
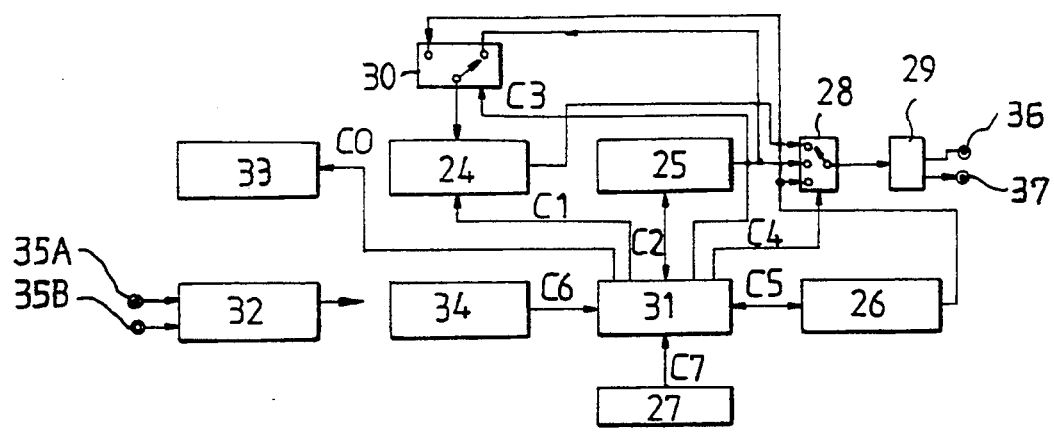
FIG. 7 is a block diagram showing the portable audio device according to this invention.

FIG. 7 is a block diagram showing the notebook type portable audio device according to this invention.

The notebook type audio device of this invention includes a display part 3 for indicating operation and control conditions of the device, a cassette tape signal processing part 24 for performing reproducing and recording operations of the cassette tape, a tuner signal processing part 25 for performing selecting, filtering and amplifying operations of AM/FM signals, a compact disc signal processing part 26 for performing reproducing operation of the compact disc, a sensing part 27 for sensing signals according to operations of the device, an output signal selecting part 28 for selecting a desired signal among the cassette tape signal, the compact disc signal and the tuner signal, an amplifying part 29 for amplifying the selected signal and transmitting it to a speaker output terminal 36 or a headphone jack 37, a recording signal selecting part 30 for selecting source of the recording signal to the cassette tape, a microcomputer 31 for controlling operations of the device in response to a key signal from a key part 34, and a power supplying part 32 for supplying power of batteries or alternative current to the device.

Upon operation of the key part 34, the microcomputer 31 reads the key signal and one among the cassette player signal, the tuner signal and the compact disc player signal is selected for providing the signal to the speakers or the headphone and one of the tuner signal and the compact disc signal is selected for recording on the cassette tape.

For example, when a cassette tape reproducing key is pressed in the key part 34, the microcomputer 31 reads the key signal C6 and produces control signals C1, C4. The cassette tape signal processing part 24 is operated in response to the control signal C1 and the output signal selecting part 28 selects the output signal of the cassette tape signal processing part 24 in response to the control signal C4. The audio signal reproduced by the cassette tape recorder is provided to speaker output terminal 36 or the headphone output terminal 37 through the output signal selecting part 28 and the amplifying part 29.

On the other hand, when an AM/FM tuner key is pressed in the key part 34, the microcomputer 31 reads the key signal C6 and produces control signals C2, C4. The AM/FM tuner signal processing part 25 is operated in response to the control signal C2 and the output signal selecting part 28 selects the output signal of the AM/FM tuner signal processing part 25 in response to the control signal C4. The audio signal tuned by the AM/FM tuner is provided to the speaker output terminal 36 or the headphone output terminal 37 through the output signal selecting part 28 and the amplifying part 29.

When a compact disc reproducing key is pressed in the key part 34, the microcomputer 31 reads the key signal C6 and produces control signals C4, C5. The compact disc signal processing part 26 is operated in response to the control signal C5 and the output signal selecting part 28 selects the output signal of the compact disc signal processing part 26. The audio signal reproduced by the compact disc player is provided to the speaker output terminal 36 or the headphone output terminal 37 through the output signal selecting part 28 and the amplifying part 29.

When a recording key is pressed, the microcomputer 31 reads the key signal C6 and produces control signal C3 in the same manner as above. The recording signal selecting part 30 selects one desired source of the recording signal from the compact disc signal and the AM/FM tuner signal. The cassette tape signal processing part 24 records the source of the recording signal to the cassette tape.

The sensing part 27 produces a signal C7, for example, when the compact disc reproducing key is pressed by mistake without mounting any disc in the compact disc player. The microcomputer 31 reads the sensed signal C7 and controls the device. The power supplying part 32 provides the power either from alternative current adapter jack 35A or batteries 35B to every part as an operation power of the device.

Figure 8:
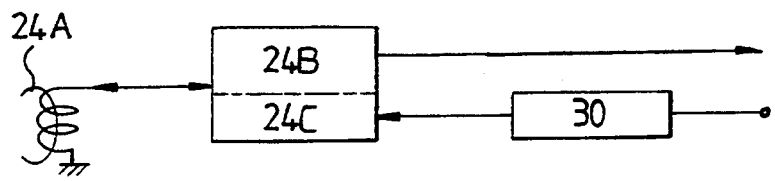
FIG. 8 is a detailed block diagram showing a cassette tape signal processing part in FIG. 7.

FIG. 8 is a detailed block diagram showing the cassette tape signal processing part of FIG. 7.

An amplifier 24B amplifys the audio signal reproduced by a recording/reproducing head 24A and the amplified signal from the amplified 24B is provided to the output signal selecting part 28. An amplifier 24C amplifies the selected signal from the recording signal selecting part 30 and the amplified signal from the amplified 24C is provided to the recording/reproducing head 24A.

Figure 9:
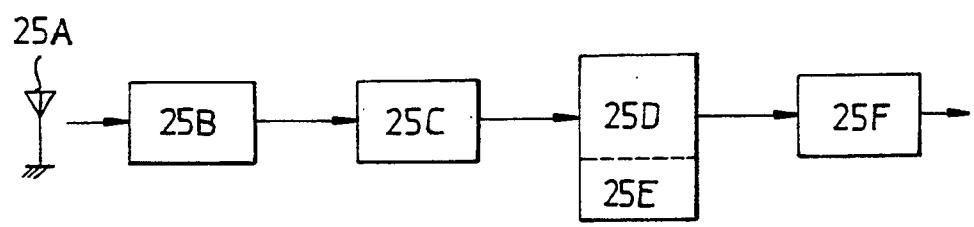
FIG. 9 is a detailed block diagram showing a tuner signal processing part of in FIG. 7.

FIG. 9 is a detailed block diagram showing the tuner signal processing part of in FIG. 7.

The AM/FM tuner signal received through an antenna 25A is high-frequency-amplified by an amplifier 25B, intermediate-frequency-amplified by an amplifier 25C. The amplified signal is demodulated to the audio signal by a demodulator 25D and a filter 25E and transmitted after being amplified by an amplifier 25F.

Figure 10:
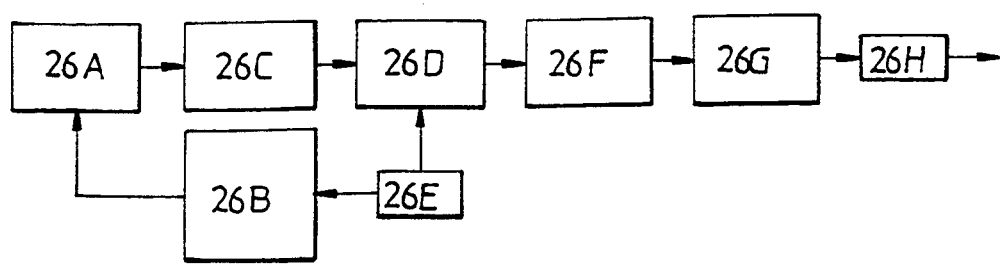
FIG. 10 is a detailed block diagram of a compact disc signal processing part in FIG. 7.

FIG. 10 is a detailed block diagram of the compact disc signal processing part in FIG. 7.

A pick-up 26A controlled by a servo motor controller 26B reproduces audio signal from the compact disc. This signal is high-frequency-amplified by an amplifier 26C, reproduced to a digital audio signal by a digital signal processor 26D. The digital audio signal is converted to an analog audio signal by a digital to analog converter (D/A converter) 26F, and transmitted through an amplifier 26H after filtered by a low-pass filter 26G. The servo motor controller 26B and the digital signal processor 26D are controlled by a controller 26E (for example, microcomputer).

As described above, in accordance with the present invention, there are the convenience of carry along, taking care and handling of the portable audio device, especially it is very convenient to carry the portable audio device without making others aware of it. Also, it is convenient to connect the speakers to the body and use an external power supply and place the headphone in a safe place without having to worry about losing the headphone.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claim.

What is claimed is:

1. A portable audio device having the functions of a cassette tape recorder, a compact disc player and an AM/FM tuner, comprising:
   a slimmed body provided with the cassette tape recorder, the compact disc player and the AM/FM tuner wherein the compact disc player and the cassette tape recorder respectively accept a compact disc and cassette tape in a same plane of the slimmed body; and
   at least one cover, provided on said slimmed body, for covering the cassette tape recorder and the compact disc player;
   wherein said slimmed body and said at least one cover are connected in a notebook arrangement.

2. A portable audio device according to claim 1, wherein said at least one cover includes a first cover for covering the cassette tape recorder, the first cover having a display part indicating the control and the operation conditions of the device, and a second cover for covering the compact disc player, the second cover having a key part operating the device.

3. A portable audio device according to claim 1, wherein said slimmed body further provides with a battery holder for accommodating batteries and a third cover for covering the battery holder.

4. A portable audio device having the functions of a cassette tape recorder, a compact disc player and an AM/FM tuner, comprising:
   a slimmed body provided with the cassette tape recorder, the compact disc player and the AM/FM tuner; and
   at least one cover, provided on said slimmed body, for covering the cassette tape recorder and the compact disc player;
   wherein said slimmed body and said at least one cover are connected in a notebook arrangement, and
   wherein said slimmed body further provides a headphone holder for safe keeping a headphone and a second cover for covering the headphone holder.

5. A portable audio device according to claim 4, wherein the headphone holder includes a headphone jack to connect a plug of the headphone and a guide groove to lead a lead line of the headphone.

6. A portable audio device according to claim 1, further comprising speakers coupled to said slimmed body detachably.

7. A portable audio device according to claim 6, wherein said slimmed body includes hinge shafts, and said speakers includes hinge plates, the hinge plates coupling with the hinge shafts and moving around the shaft within a certain range of angles.

8. A portable audio device according to claim 7, wherein the hinge shafts and the hinge plates are made of conductive material for transmitting audio signals of the device to said speakers directly.

9. A portable audio device according to claim 1, said slimmed body further provides with means for belting the device.

10. A portable audio device having the functions of a cassette tape recorder, a compact disc player and an AM/FM tuner, comprising:
- a slimmed body provided with the cassette tape recorder, the compact disc player and the AM/FM tuner; and
- at least one cover, provided on said slimmed body, for covering the cassette tape recorder and the compact disc player;
- wherein said slimmed body and said at least one cover are connected in a notebook arrangement,
- wherein said slimmed body further provides means for belting the device, and
- wherein the belting means includes a belt for carrying the device, one end of the belt fixed rotatably on said slimmed body and the other end of the belt provided with a first adhesive member, and a second adhesive member provided on said slimmed body within the rotating range of the belt, for adhering with the first adhesive member.

11. A portable audio device having a cassette tape recorder, a compact disc player and an AM/FM tuner, comprising:
- a slimmed body provided with the cassette tape recorder, the compact disc player and the AM/FM tuner wherein the compact disc player and the cassette tape recorder respectively accept a compact disc and a cassette tape in same plane of the slimmed body;
- a cassette tape recorder cover for closing the cassette tape recorder, the cassette tape recorder cover having a display part indicating control and operation conditions of the portable audio device;
- a compact disc player cover for closing the compact disc player, the compact disc player cover having a key part operating the portable audio device; and
- speakers detachably coupled to said slimmed body;
- wherein said slimmed body and said cassette tape recorder and compact disc player covers are connected in a notebook arrangement.

12. A portable audio device according to claim 11, said slimmed body further provides with means for belting the device.

13. A portable audio device having a cassette tape recorder, a compact disc player and an AM/FM tuner, comprising:
- a slimmed body provided with the cassette tape recorder, the compact disc player and the AM/FM tuner;
- a cassette tape recorder cover for closing the cassette tape recorder, the cassette tape recorder cover having a display part indicating control and operation conditions of the portable audio device;
- a compact disc player cover for closing the compact disc player, the compact disc player cover having a key part operating the device; and
- speakers detachably coupled to said slimmed body;
- wherein said slimmed body and said cassette tape recorder and compact disc player covers are connected in a notebook arrangement,
- herein said slimmed body further provides means for belting the device, and
- wherein the belting means includes a belt for carrying the device, one end of the belt fixed rotatably on said slimmed body and the other end of the belt provided with a first adhesive member, a second adhesive member provided on said slimmed body within the rotating range of the belt, for adhering with the first adhesive member, and the speakers provided with third adhesive member for adhering with said second adhesive member, the third adhesive members formed on areas where the belt does not interfere.

14. A notebook type portable audio device having a cassette tape recorder, a compact disc player and an AM/FM tuner, comprising;
- first means for processing a first signal according to recording and reproducing operations of the cassette tape recorder;
- second means for processing a second signal according to a tuning operation of the AM/FM tuner;
- third means for processing a third signal according to a reproducing operation of the compact disc player;
- a microcomputer for producing control signals in response to a key signal indicating a desired function;
- first select means for selecting a desired signal among the first, second and third signals received from said first, second and third means in response to the control signals received from said microcomputer; and
- second select means for selecting a source of recording signal of the desired signal selected by said first select means in response to the control signals,
- wherein said cassette tape recorder and said compact disc player respectively accept a cassette tape and a compact disc in a same plane of the portable audio device.

15. A notebook type portable audio device according to claim 14, further comprising means for displaying the control and the operation conditions of the device.

* * * * *